United States Patent
Oikonomou et al.

(10) Patent No.: US 12,136,149 B2
(45) Date of Patent: *Nov. 5, 2024

(54) TECHNIQUES FOR RENDERING VECTOR GRAPHICS USING PRECOMPUTED TEXTURES

(71) Applicant: Think Silicon Research and Technology Single Member S.A., Rion Achaias (GR)

(72) Inventors: Ioannis Oikonomou, Patras (GR); Georgios Keramidas, Patras (GR)

(73) Assignee: Think Silicon Research and Technology Single Member S.A., Rion Achaias (GR)

( * ) Notice: Subject to any disclaimer, the term of this patent is extended or adjusted under 35 U.S.C. 154(b) by 0 days.

This patent is subject to a terminal disclaimer.

(21) Appl. No.: 18/493,157

(22) Filed: Oct. 24, 2023

(65) Prior Publication Data
US 2024/0054702 A1 Feb. 15, 2024

Related U.S. Application Data

(63) Continuation of application No. 17/658,186, filed on Apr. 6, 2022, now Pat. No. 11,893,667.

(51) Int. Cl.
*G06T 11/40* (2006.01)
*G06T 1/20* (2006.01)

(52) U.S. Cl.
CPC ............. *G06T 11/40* (2013.01); *G06T 1/20* (2013.01)

(58) Field of Classification Search
CPC ......... G06T 1/20; G06T 11/203; G06T 11/40; G06T 15/04
USPC .................................................. 345/501, 582
See application file for complete search history.

(56) References Cited

U.S. PATENT DOCUMENTS

2010/0110093 A1 5/2010 Nystad et al.
2017/0039739 A1* 2/2017 Doran ..................... G06T 17/00

OTHER PUBLICATIONS

Wei Zhang, Yonggao Yang, Song Xing. "Texture Mapping with Vector Graphics: A Nested Mipmapping Solution".

* cited by examiner

*Primary Examiner* — Jacinta M Crawford
(74) *Attorney, Agent, or Firm* — M&B IP Analysts, LLC

(57) ABSTRACT

A system and method for rendering vector graphics using precomputed textures, includes receiving a vector image, the vector image including a plurality of instructions, each instruction for rendering at least a geometric primitive; detecting in the plurality of instructions an instruction for generating a first Bezier curve; selecting a first precomputed curve in a texture map to match the first Bezier curve; and generating a raster image based at least on the first precomputed curve. In an embodiment selecting the first precomputed curve includes computing a transformation matrix between the first precomputed curve and target coordinates, wherein the target coordinates are coordinates of a display; computing texture coordinates based on the computed transformation matrix and the texture map; and rendering an adapted precomputed curve, based on the texture map and the computed texture coordinates.

20 Claims, 5 Drawing Sheets

TECHNIQUES FOR RENDERING VECTOR GRAPHICS USING PRECOMPUTED TEXTURES

CROSS-REFERENCE TO RELATED APPLICATIONS

This application is a continuation of U.S. patent application Ser. No. 17/658,186, filed Apr. 6, 2022, which claims the benefit of European Patent Application No. 22386015.6 filed on Mar. 31, 2022, the contents of which are hereby incorporated by reference.

TECHNICAL FIELD

The present disclosure relates generally to graphics rendering, and specifically to improved techniques for rendering vector graphics using precomputed textures.

BACKGROUND

Vector graphics is a field in computer graphics generation, whereby visual images are generated based on geometric definitions. Using geometric primitives, which are predefined functions, it is possible to scale images up or down without losing resolution, as all the information to render the image in the required resolution is present in the geometric primitives. As a simple example, in order to generate visual image of a circle, a renderer need only receive a starting point and a radius size, and this is all the information needed in order to generate a circle image in the required location. This can be stored as less information than, for example, defining each pixel in the circle and storing that information.

However, most displays today are raster displays, which address pixels, and not vectors. Therefore, a vector format image needs to be converted into a raster format which can be displayed on a regular display. Furthermore, certain devices may not natively support vector graphics. Examples for such devices include smartwatches which have small displays and limited compute power may not support the required computation from a powerful GPU (graphics processing unit) or CPU (central processing unit) which are required to generate such images. Even in cases where they are supported, using a computational resource (e.g., performing a calculation on a GPU or CPU) requires power usage in a mobile device which is typically paired with a battery source. Such use would be detrimental to prolonging battery life.

One process of converting a vector image to a raster image, known also as scan converting, or rasterizing, includes evaluating a Bezier curve at multiple points which are closely spaced, and approximate a line between these two points. However, this has some computational disadvantages. For example, an excessive number of points may be generated in an area of the curve, which is substantially linear, leading to processor use which would not increase the quality of the rendered curve. As another example, the points may be placed too far apart, i.e., there would be too few dissections, resulting in a curve which does not appear to be smooth.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for rendering vector graphics using precomputed textures. The method comprises: detecting in the plurality of instructions an instruction for generating a first Bezier curve; selecting a first precomputed curve in a texture map to match the first Bezier curve; and generating a raster image based at least on the first precomputed curve.

Certain embodiments disclosed herein also include a non-transitory computer readable medium having stored thereon causing a processing circuitry to execute a process, the process comprising: detecting in the plurality of instructions an instruction for generating a first Bezier curve; selecting a first precomputed curve in a texture map to match the first Bezier curve; and generating a raster image based at least on the first precomputed curve.

Certain embodiments disclosed herein also include a system for rendering vector graphics using precomputed textures. The system comprises: a processing circuitry; and a memory, the memory containing instructions that, when executed by the processing circuitry, configure the system to: receive a vector image, the vector image including a plurality of instructions, each instruction for rendering at least a geometric primitive; detect in the plurality of instructions an instruction for generating a first Bezier curve; select a first precomputed curve in a texture map to match the first Bezier curve; and generate a raster image based at least on the first precomputed curve.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
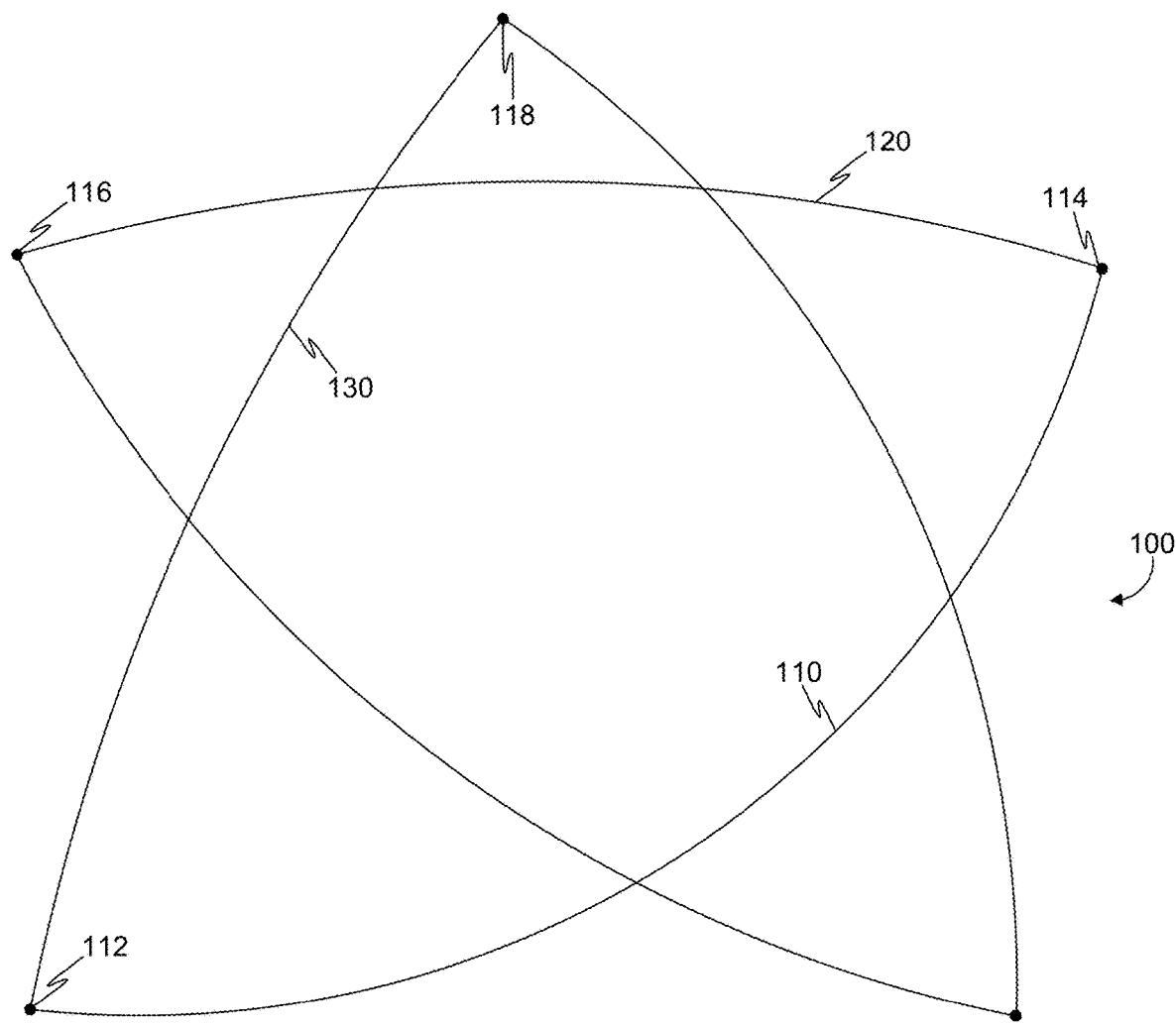
FIG. 1 is a composite Bezier curve, utilized according to the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for rendering vector graphics using precomputed textures, includes receiving a vector image, the vector image including a plurality of instructions, each instruction for rendering at least a geometric primitive; detecting in the plurality of instructions an instruction for generating a first Bezier curve; selecting a first precomputed curve in a texture map to match the first Bezier curve; and generating a raster image based at least on the first precomputed curve. In an embodiment selecting the first precomputed curve includes computing a transformation matrix between the first precomputed curve and target coordinates, wherein the target coordinates are coordinates of a display; computing texture coordinates based on the computed transformation matrix and the texture map; and rendering an adapted precomputed curve, based on the texture map and the computed texture coordinates. Rendering vector graphics using precomputed textures allows to reduce, and in some embodiments, eliminate, other more computationally expensive rendering techniques, such as scan converting.

FIG. 1 is an example of a composite Bezier curve 100, utilized according to the disclosed embodiments. A Bezier curve is a geometric primitive used in vector graphics. A Bezier curve may be linear, quadratic, or cubic. A linear Bezier curve is simply a straight line between two points. A quadratic Bezier curve is defined by two end points and a control point, while a cubic Bezier curve is defined by two end points and two control points.

The example illustrated in FIG. 1 is of a composite Bezier curve 100, which is a path comprised of a plurality of Bezier curves where each end point of any Bezier curve is connected to another end point of another Bezier curve. The endpoints illustrated in FIG. 1 are purposefully accentuated, in a real-world application the endpoints are typically not noticeable and are rendered in the same manner as the entire curve.

A first endpoint 112 and a second endpoint 114 together with a control point (not shown) define a first Bezier curve 110. The second endpoint 114 and a third endpoint 116 together with a control point (not shown) define a second Bezier cure 120. A fourth endpoint 118 and the first endpoint 112 together with a control point (not shown) define together a third Bezier curve 130. In the composite Bezier curve 100, the first Bezier curve 110 shares an endpoint with the second Bezier curve 120 and the third Bezier curve 130.

The composite Bezier curve 100 includes a plurality of quadratic Bezier curves. While not shown, it should be noted that a cubic Bezier curve can be defined as an affine combination of two quadratic Bezier curves. Generally, Bezier curves are invariant under affine transformations, meaning that a Bezier curve which is any of: scaled, rotated, and sheared, remains a Bezier curve. In order to display the composite Bezier curve 100 the path needs to be rasterized, for example by the methods further discussed herein.

Figure 2:
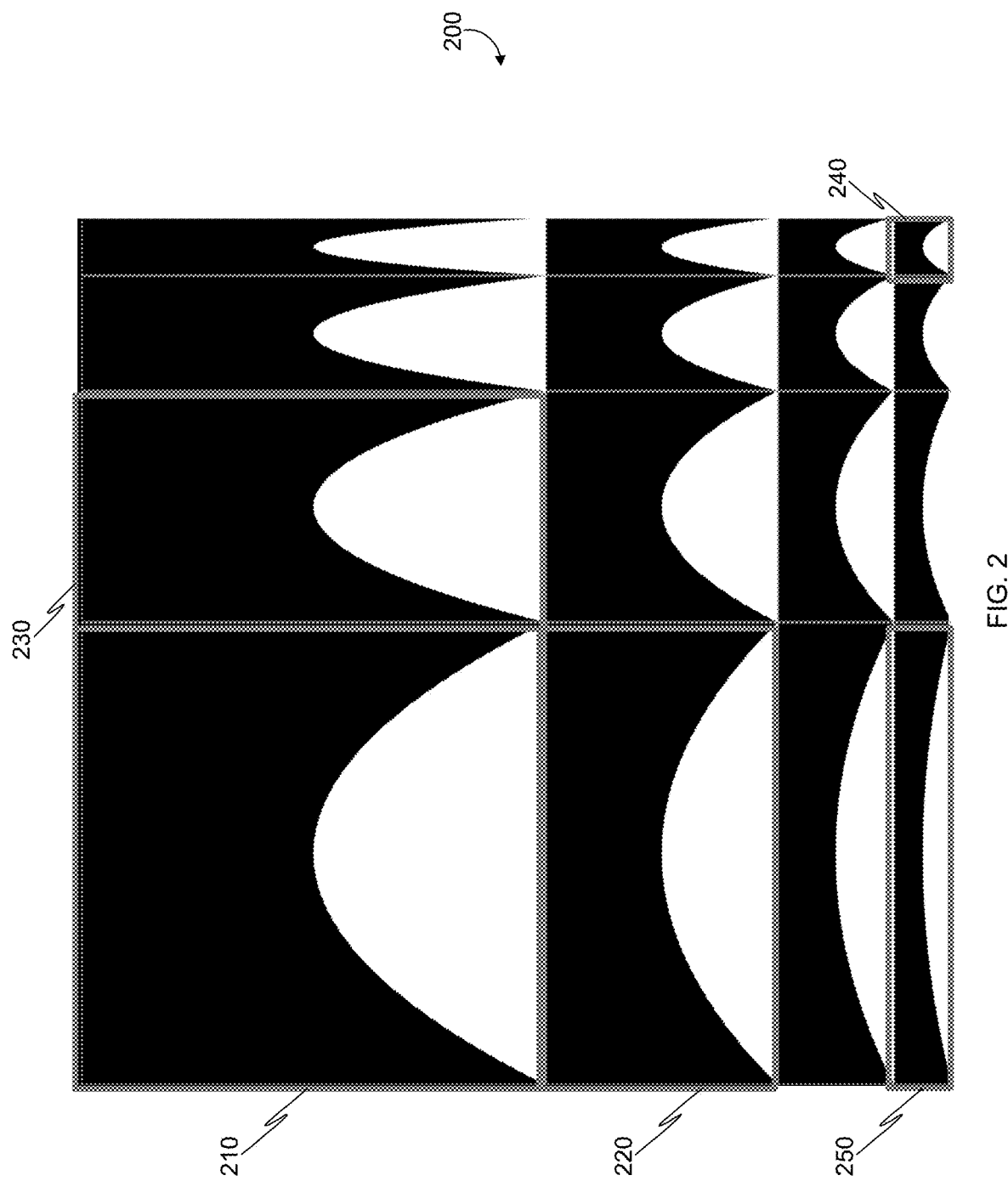
FIG. 2 is a precomputed texture map for rendering vector graphics, implemented in accordance with an embodiment.

FIG. 2 is a precomputed texture map 200 for rendering vector graphics, implemented in accordance with an embodiment. In certain embodiments, a plurality of texture maps may be implemented, each having a different initial curve (also known as a principal image). The precomputed texture map 200 includes a principal image 210, and a plurality of images which are linear transformations of the principal image 210, having different sizes, which are smaller than the principal image 210 in at least height or width.

For example, a first image 220 shares the same width as the principal image, but has a height which is one half of the height of the principal image. For example, if the principal image is 256 by 256 pixels, the first image 220 is 256 by 128 pixels. A second image 230 is one half the width of the principal image 210 and the same height. Following the previous example, the second image 230 would have a size of 128 by 256 pixels.

The texture map 200 may further include one or more images sharing a proportion (i.e., ratio of width to height), but having a different size. For example, if the principal image 210 is 256 by 256 pixels, the texture map 200 may further include secondary images at 128 by 128 pixels, 64 by 64 pixels, and a first secondary image 240 which is 64 by 64 pixels.

Each image corresponds to a precomputed curve, which are all based on the curve of the principal image 210. Therefore, curves from the texture map 200 can be used to match curves of a Bezier curve. In certain embodiments, interpolation between two images can generate a Bezier curve which is between two images (e.g., equally likely matches both curves). For example, a curve of a fourth image 250 corresponds to the third Bezier curve 130 of FIG. 1 above, when applying a proper rotation and scale. As another example, a curve of the principal image 210 corresponds to the first Bezier curve 110 of FIG. 1 above, when applying a proper rotation and scale. Each Bezier curve of the composite Bezier curve may be matched to a curve of texture map 200. Rendering of the image may then be performed based on the texture map, and as the texture map is precomputed, rendering can occur faster (i.e., using less compute resources). An example of such a method for rendering is discussed in more detail in FIG. 3 below.

Figure 3A:
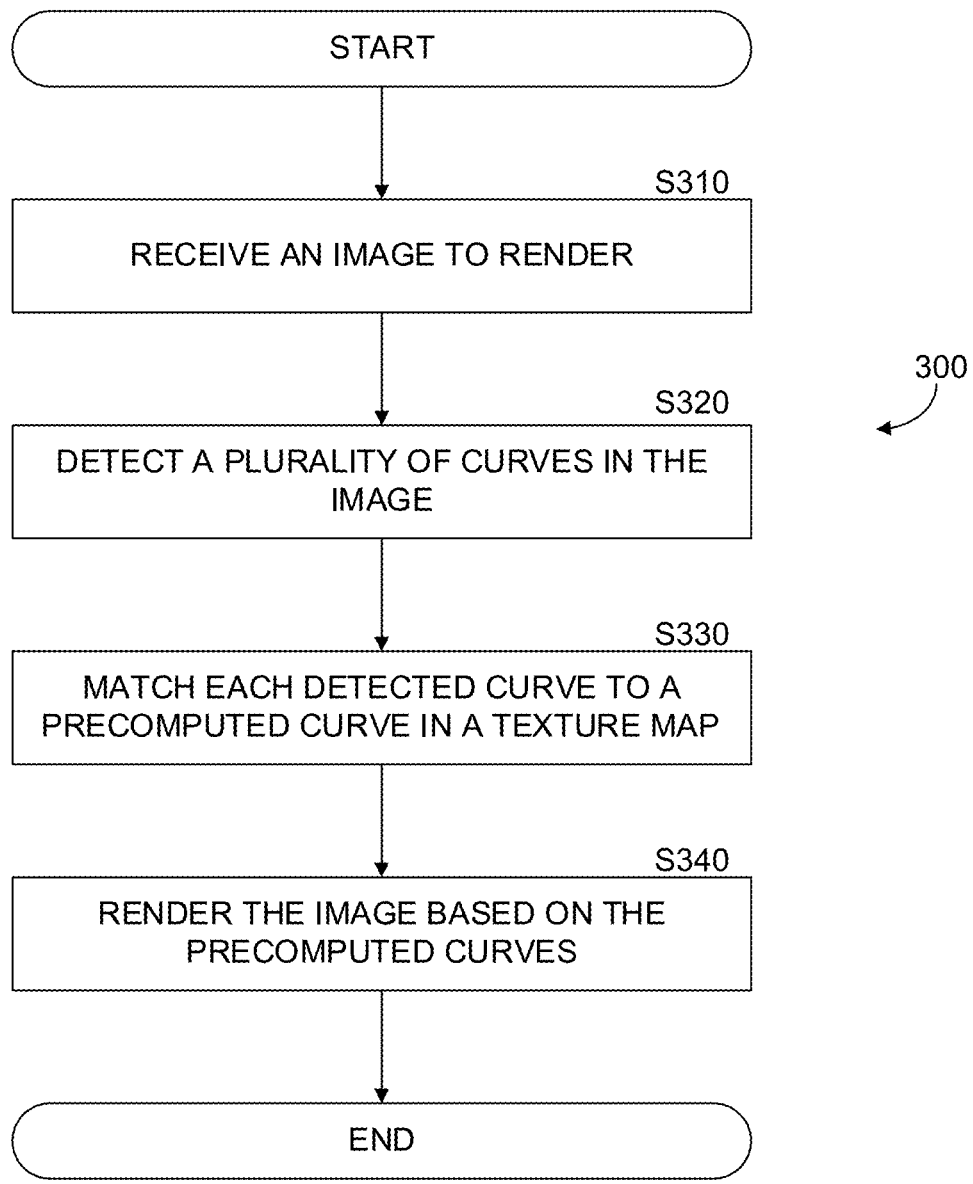
FIG. 3A is a flowchart of a method for rendering a vector graphic on a raster display utilizing a texture map, implemented in accordance with an embodiment.

FIG. 3A is an example flowchart 300A of a method for rendering a vector graphic on a raster display utilizing a texture map, implemented in accordance with an embodiment. Utilizing a texture map reduces the use of scan converting a Bezier curve, thus reducing the amount of calculations required by a processor. This is advantageous, as doing so allows to use a less powerful processor (than if rendering were performed only using scan converting), or alternatively use less processing (i.e., fewer cycles) of a regular processor. In certain embodiments, use of scan converting may be eliminated completely, and the texture map technique is used exclusively to render the Bezier curve.

At S310, a vector image is received. The vector image may be received as file, for example, including instructions that when executed by a renderer, cause the renderer to render an image on a display. The instructions may include a plurality of geometric primitives. A geometric primitive may be, for example, a Bezier curve, a path, a point, a polygon, a spline, a fractal, and the like. In an embodiment the vector image is received for example from a web server, in response to requesting a resource through a uniform resource locator (URL). A vector image may include a format type, such as SVG (scalable vector graphics), Adobe® Illustrator Artwork (AI), and the like.

At S320, a plurality of Bezier curves are detected in the received image. In an embodiment, detecting a Bezier curve includes searching a received file for a curve indicator. The curve indicator indicates that a particular code in the file causes generation of a curve. For example, the file may have a Scalable Vector Graphics (SVG) file format. A code starting with a <path> header indicates a curve. For example, the <path> header may include a first end point, a control point, and a second end point.

At S330, each detected Bezier curve is matched to a precomputed curve in a texture map. In certain embodiments, a plurality of texture maps may be utilized. In some embodiments, a first texture map includes a plurality of quadratic Bezier curves, while a second texture map includes a plurality of cubic Bezier curves. In an embodiment, the texture map includes a plurality of precomputed images, each image corresponding to a Bezier curve, for example as discussed above in FIG. 2. In some embodiments, a Bezier curve may be matched to two images from a texture map. In such embodiments, a third Bezier curve may be generated by performing an interpolation between the first matched image and second matched image.

In some embodiments, a Bezier curve may be matched to a precomputed image within a predefined tolerance. For example, a first end point, second end point, and control point, should be within a 5% difference of each coordinate between the curve and the precomputed image. For example, if the first end point of a curve is at (50, 100), the second end point of the curve is at (100, 100), and the control point of the curve is at (25, 75), a precomputed image having a first endpoint at (51,101), a second end point at (102, 100), and a control point at (25, 75) would be considered acceptable, and would be rendered based on the precomputed image. A method for performing matching of detected curve to a precomputed curve is discussed in more detail in FIG. 3B below.

In certain embodiments, a first Bezier curve may be matched to an image from a first texture map, and a second curve may be matched to an image from a second texture map.

At S340, an image is rendered based at least on the matched precomputed images. In some embodiments, rasterization of a portion of the vector image is generated based on the precomputed images, while another portion is generated based on another method. For example, another method may be scan converting. By rendering at least, a portion of the vector image based on precomputed images the amount of calculations required to be performed by a processing unit is reduced.

In certain embodiments, the entire received image is rendered using the precomputed images. For each curve a closest matching precomputed image (i.e., precomputed image of a curve) is determined, and the precomputed image is used regardless of the how well the precomputed image matches the detected Bezier curve. While this may lead to a loss in quality of the image, such as loss of smoothness of the generated image, this loss may be acceptable in some applications, especially where the image details are not visually significant, such as font serifs.

In some embodiments, rendering the image may further include performing a transformation on at least a precomputed image. The transformation may include any of rotation, scale, and shear.

Figure 3B:
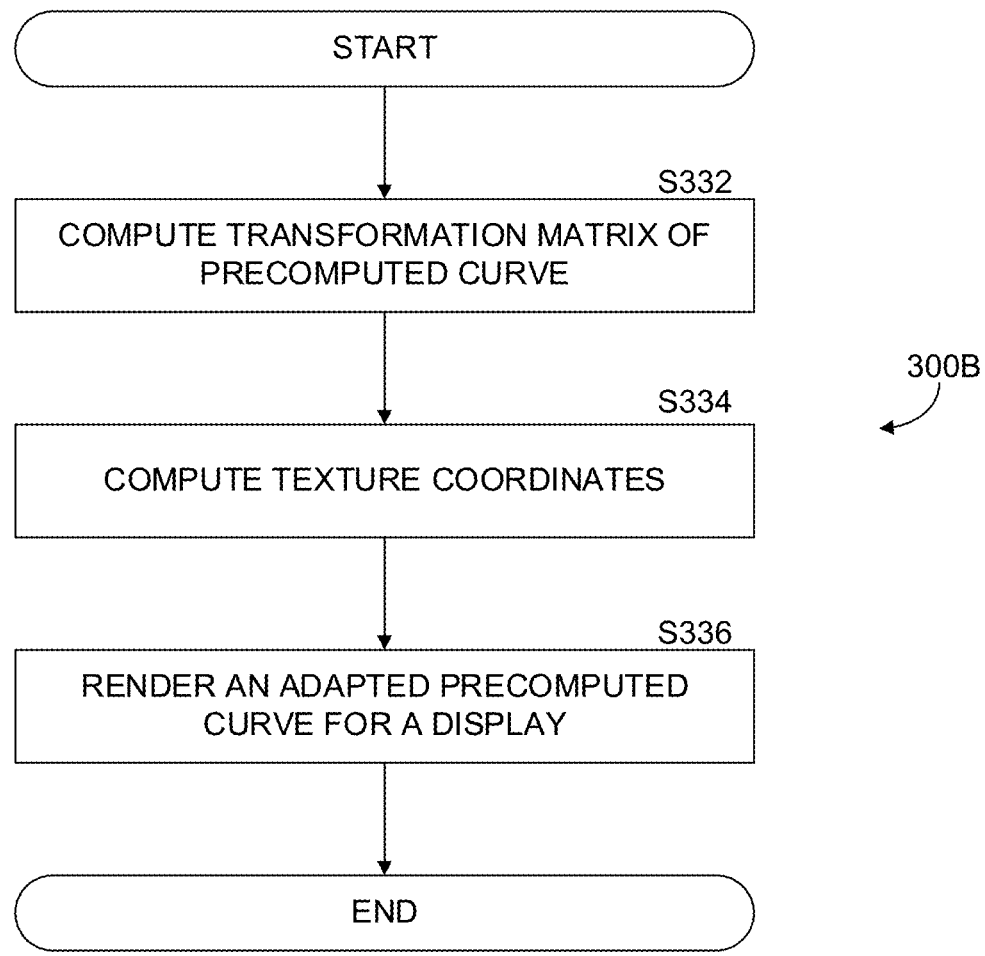
FIG. 3B is a flowchart of a method for matching a detected curve to a precomputed curve, implemented in accordance with an embodiment.

FIG. 3B is an example of a flowchart 300B of a method for matching a detected curve to a precomputed curve, implemented in accordance with an embodiment.

At S332, a transformation matrix is computed. In an embodiment, the transformation matrix receives as an input the precomputed curve, and a set of target coordinates. In an embodiment, the set of target coordinates are coordinates of the display on which a curve should be displayed. In certain embodiments, the transformation matrix may be a correlation matrix, which includes therein coefficients to describe the transformation between the precomputed curve and the target coordinates. In some embodiments, computing or determining the transformation matrix may be performed by a processing circuitry, such as a host CPU, a GPU vertex processor, and the like. In an embodiment the transformation matrix may be stored, for example, as a data array.

In certain embodiments, the processing circuitry may have an accuracy level set by a number of bits, for example a floating-point unit (FPU) may be used which has an accuracy smaller than the host CPU to which it is connected. In such embodiments, an error level may be set, to determine what an acceptable error is when matching a precomputed curve to a detected curve. When an error is introduced into the transformation matrix the result may be that the precomputed curve does not exactly match the detected curve. However, for some applications this may be acceptable, especially if, for example, the lower accuracy FPU consumes less power than the high accuracy CPU. In some embodiments, the processing circuitry includes a fixed point arithmetic logic unit (ALU). The ALU is a combinational logic circuit which performs arithmetic, and bitwise, operations on integer binary numbers. An ALU may be utilized in embodiments where, for example, a low-cost embedded microprocessor is required to render images for a display. The accuracy of an ALU depends on its bit size (or word size). In certain embodiments, a plurality of ALUs may be utilized, each having an accuracy level. In some embodiments, a plurality of FPUs may be utilized, each having an accuracy level. In yet other embodiments, a plurality of ALUs and a plurality of FPUs may be utilized, each having their own accuracy level. In some embodiments, two or more ALUs may share an accuracy level. In yet other embodiments, two or more FPUs may share an accuracy level.

At S334, texture coordinates are computed. In an embodiment, an interpolation is performed between the transformation matrix and a texture map which includes the precomputed curve. In some embodiments, a set of interpolations may be performed between the transformation matrix and the texture map. In certain embodiments, the interpolation may be performed by the processing circuitry. The processing circuitry for performing interpolations may include the GPU vertex processor, a GPU rasterizer, the host CPU, and the like.

In certain embodiments, the processing circuitry may have an accuracy level set by a number of bits, for example a floating-point unit (FPU) may be used which has an accuracy smaller than the GPU rasterizer to which it is connected. In such embodiments, an error level may be set, to determine what an acceptable error is when performing an interpolation. When an error is introduced into the interpolation the result may be a curve which includes artifacts when rendering. However, for some applications this may be acceptable, especially if, for example, the lower accuracy FPU consumes less power than the high accuracy GPU rasterizer.

At S336, an adapted precomputed curve is rendered. In certain embodiments, rendering the adapted precomputed curve is performed as part of S340 of FIG. 3A above. The adapted precomputed curve is a curve which is rendered based on the precomputed curve and the detected curve. A precomputed curve is adapted to match the detected curve (e.g., by rotating the curve) and then rendered as an adapted precomputed curve. In an embodiment, rendering the adapted precomputed curve is performed by a fragment shader of the GPU. For example, a texture mapping unit (TMU) may read the texture map, and the fragment shader may then render the adapted precomputed curve based on the texture map and the texture coordinates.

An FPU accuracy may be determined by the number of bits the FPU is able to process. In certain embodiments, an error rate threshold may be predetermined, to define an error rate at which computations are performed on the FPU. For example, a computation with an error rate above the threshold may be performed on a more powerful processing circuitry, such as a host CPU or GPU, while an error rate at or below the threshold may allow the computation to be performed on the FPU.

Figure 4:
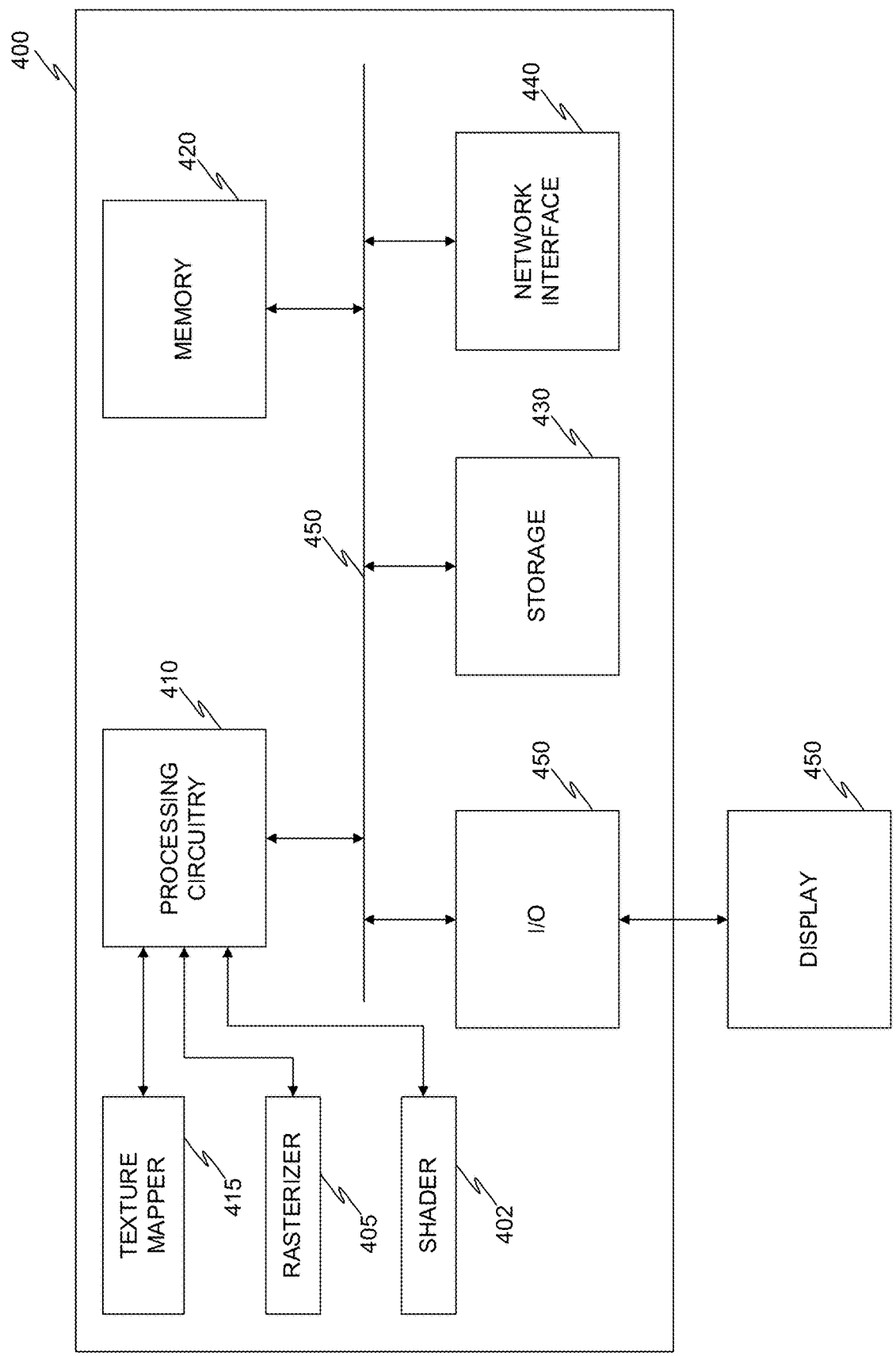
FIG. 4 is a schematic diagram of a system for rendering a vector image on a raster display according to an embodiment.

FIG. 4 is an example schematic diagram of a system 400 for rendering a vector image on a raster display according to an embodiment. The system 400 includes a processing circuitry 410 coupled to a memory 420, a storage 430, a network interface 440, and an I/O (input/output) interface 450. In an embodiment, the components of the system 400 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, solid state storage, and the like, and may be realized, for example, as flash memory or other memory technology, or any other medium which can be used to store the desired information.

The network interface 440 allows the system 400 to communicate with, for example, another system, from which vector images may be received.

The I/O interface 450 may provide inputs to the processing circuitry 410 and send output to various peripheral devices. A peripheral device may be, for example, a display 450. In certain embodiments the I/O interface 450 is implemented as electronic circuitry which includes, for example, a display controller for controlling the display 450.

The processing circuitry 410 may further include at least one of: a texture mapper 415, a rasterizer 405, and a fragment shader 402. In an embodiment the texture mapper 415 may be implemented within the processing circuitry 410, for example as a texture mapping unit (TMU). In an embodiment, the rasterizer 405 is implemented as a fixed-function circuitry. the rasterizer 405 may receive a vector image, and transform the vector image into fragments, which correspond to a grid point on a display. The rasterizer 405 generates a continuous primitive from discrete fragments. In an embodiment, the rasterizer 405 may also include a z-buffer (not shown). In some embodiments, the fragment shader 402 is configured to render an adapted precomputed curve, for example as detailed in FIG. 3B above.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for rendering vector graphics using precomputed textures, comprising:
   receiving a vector image, the vector image including a plurality of instructions, each instruction for rendering at least a geometric primitive;
   detecting in the plurality of instructions an instruction for generating a first Bezier curve;
   selecting a first precomputed curve in a texture map to match the first Bezier curve;
   computing a transformation matrix between the first precomputed curve and target coordinates, wherein the target coordinates are coordinates of a display; and
   generating a raster image based at least on the first precomputed curve.

2. The method of claim 1, further comprising:
   computing texture coordinates based on the computed transformation matrix and the texture map.

3. The method of claim 2, further comprising:
   rendering an adapted precomputed curve, based on the texture map and the computed texture coordinates.

4. The method of claim 3, further comprising:
   configuring a fragment shader to render the adapted precomputed curve.

5. The method of claim 2, wherein any one of is computed on a floating point unit (FPU) having a predetermined accuracy: the transformation matrix, and the texture coordinates.

6. The method of claim 2, wherein any one of is computed on an arithmetic logic unit (ALU) having a predetermined accuracy: the transformation matrix, and the texture coordinates.

7. The method of claim 2, further comprising:
   generating a correlation matrix between the precomputed curve and the target coordinates.

8. The method of claim 2, further comprising:
   computing an interpolation between the computed transformation matrix and the texture map.

9. The method of claim 1, wherein any one of: an a floating point united (FPU), and an arithmetic logic (ALU), is selected to perform a computation based on a predetermined error rate threshold.

10. A non-transitory computer-readable medium (CRM) storing a set of instructions for rendering vector graphics using precomputed textures, the set of instructions comprising:
    one or more instructions that, when executed by one or more processors of a device, cause the device to:
    receive a vector image, the vector image including a plurality of instructions, each instruction for rendering at least a geometric primitive;
    detect in the plurality of instructions an instruction for generating a first Bezier curve;
    select a first precomputed curve in a texture map to match the first Bezier curve;
    compute a transformation matrix between the first precomputed curve and target coordinates, wherein the target coordinates are coordinates of a display; and
    generate a raster image based at least on the first precomputed curve.

11. The CRM of claim 10, wherein the one or more instructions, when executed by one or more processors of the device, further cause the device to:
    compute texture coordinates based on the computed transformation matrix and the texture map.

12. The CRM of claim 11, wherein the one or more instructions, when executed by one or more processors of the device, further cause the device to:
    render an adapted precomputed curve, based on the texture map and the computed texture coordinates.

13. The CRM of claim 12, wherein the one or more instructions, when executed by one or more processors of the device, further cause the device to:
    configure a fragment shader to render the adapted precomputed curve.

14. The CRM of claim 11, wherein any one of is computed on a floating point unit (FPU) having a predetermined accuracy:
    the transformation matrix, and the texture coordinates.

15. The CRM of claim 11, wherein any one of is computed on an arithmetic logic unit (ALU) having a predetermined accuracy:
    the transformation matrix, and the texture coordinates.

16. The CRM of claim 11, wherein the one or more instructions, when executed by one or more processors of the device, further cause the device to:
    generate a correlation matrix between the precomputed curve and the target coordinates.

17. The CRM of claim 11, wherein the one or more instructions, when executed by one or more processors of the device, further cause the device to:
    compute an interpolation between the computed transformation matrix and the texture map.

18. The CRM of claim 10, wherein any one of:
    a floating point unit (FPU), and an arithmetic logic unit (ALU), is selected to perform a computation based on a predetermined error rate threshold.

19. The CRM of claim 10, wherein the one or more processors of the device further comprises any one of: a floating point unit (FPU), an arithmetic logic unit (ALU), a fragment shader, a rasterizing unit, a graphical processing unit (GPU), a central processing unit (CPU), and a combination thereof.

20. A system for rendering vector graphics using precomputed textures comprising:
    a processing circuitry;
    a memory, the memory containing instructions that, when executed by the processing circuitry, configure the system to:
    receive a vector image, the vector image including a plurality of instructions, each instruction for rendering at least a geometric primitive;
    detect in the plurality of instructions an instruction for generating a first Bezier curve;
    select a first precomputed curve in a texture map to match the first Bezier curve;
    compute a transformation matrix between the first precomputed curve and target coordinates, wherein the target coordinates are coordinates of a display; and
    generate a raster image based at least on the first precomputed curve.

* * * * *